United States Patent [19]
Robinson

[11] Patent Number: 5,774,721
[45] Date of Patent: *Jun. 30, 1998

[54] METHOD OF COMMUNICATION BETWEEN PROCESSORS IN A DISTRIBUTED PROCESSING SYSTEM HAVING A HOST PROCESSOR AND AT LEAST ONE OBJECT ORIENTED PROCESSOR

[75] Inventor: Jeffrey I. Robinson, New Fairfield, Conn.

[73] Assignee: IQ Systems, Inc., Newtown, Conn.

[*] Notice: The term of this patent shall not extend beyond the expiration date of Pat. No. 5,634,070.

[21] Appl. No.: 525,475

[22] Filed: Sep. 8, 1995

[51] Int. Cl.⁶ .................................. G06F 15/163
[52] U.S. Cl. .................. 395/683; 395/680; 395/681; 395/800; 395/200.03
[58] Field of Search ........................ 395/704, 705, 395/800, 200.05, 683, 684, 680, 681

[56] References Cited

U.S. PATENT DOCUMENTS

| 5,228,137 | 7/1993 | Kleinerman et al. | 395/500 |
|---|---|---|---|
| 5,386,412 | 1/1995 | Pork et al. | 370/270 |
| 5,440,687 | 8/1995 | Coleman et al. | 395/200.66 |
| 5,519,875 | 5/1996 | Yokoyama et al. | 395/683 |
| 5,592,622 | 1/1997 | Isfeld et al. | 395/200.37 |
| 5,594,910 | 1/1997 | Filepp et al. | 395/800.26 |
| 5,634,070 | 5/1997 | Robinson | 395/800 |

OTHER PUBLICATIONS

"CAN controlling from cars to X-rays" by McLaughlin, undated.
Lonworks Products Motorola Master Selection Guide Revision 7, 2nd quarter 1994 pp. 2.6-2 through 2.6-7.
"Intel i960 RP sports PCI-to-PCI bridge", by Wirbel, EE Times, Jun. 19, 1995.

Primary Examiner—Alvin E. Oberley
Assistant Examiner—Majid A. Banankhah
Attorney, Agent, or Firm—David P. Gordon

[57] ABSTRACT

Distributed processing systems having a host processor and at least one object oriented processor are disclosed. An object oriented processor according to the invention has a communications interface, an intelligent message handler, and a task-specific functionality. The communications interface is coupled to a host processor via a message based communications link. A high level command language is provided which is easily implemented in a host processor program. The command language includes subsets of commands which are understood by different object oriented processors having different functionality. According to one embodiment, the object oriented processor includes support for a broad array of input and output devices. The command language includes high level commands for initializing, reading from and/or writing to the peripherals supported by the object oriented processor. According to another embodiment, the object oriented processor of the invention is addressable and several object oriented processors having similar functionality can be coupled to a single host via the same comms link. According to yet another embodiment, an object oriented processor according to the invention further includes a linking table and a periodic message generator which allows one object oriented processor to communicate directly with another object oriented processor without supervision by the host processor.

13 Claims, 10 Drawing Sheets

METHOD OF COMMUNICATION BETWEEN PROCESSORS IN A DISTRIBUTED PROCESSING SYSTEM HAVING A HOST PROCESSOR AND AT LEAST ONE OBJECT ORIENTED PROCESSOR

BACKGROUND OF THE INVENTION

1. Field of the Invention

The invention relates to distributed processing systems. More particularly, the invention relates to methods and apparatus for distributing processing tasks between a real-time host processor and at least one object oriented processor, such as an I/O processor, wherein the host processor is substantially relieved of real time interrupts.

2. State of the Art

Early ("batch mode") data processors operated with peripheral devices in a strictly sequential manner governed by a sequential software program. For example, a software program instructed the central processor to control a card reader to sequentially read input from punched cards. The input was sequentially manipulated according to the program and the processor was instructed to control a line printer to print output one line at a time in a sequential manner. At no time did two peripheral devices attempt to operate simultaneously.

Modern ("real time" or "multi-tasking") computers permit seemingly simultaneous operation of peripherals by interrupting the processor periodically to control several peripheral devices. For example, as a user types on a keyboard, the input from this peripheral to the processor is seemingly simultaneously displayed by the processor on a video display peripheral. In reality, the processor is interrupted periodically from displaying output on the video display in order to obtain input from the keyboard. It is only because the processor operates at a very high speed that there is an illusion of simultaneity. In a more complex processing system, there may be several peripherals vying for processor attention at any time. For example, in a desktop multimedia computer, several peripheral devices must be controlled by the processor in a seemingly simultaneous manner in order to produce the proper results. The peripheral devices in this system might include a CD-ROM drive, a hard disk drive, a color video display, a stereo sound card, a keyboard, and a mouse, a joystick, or a graphics tablet. Moreover, the programming environment in a system having so many demanding peripheral devices is incredibly complex. The system software must be written to schedule processor attention to each device, assign priority to each device and allow each device to interrupt the processor at appropriate times. The system software must then schedule tasks for the processor in response to the interrupts from various peripheral devices.

The complexity of task scheduling if further complicated by the fact that control of the peripherals is typically at a very low level and on an event by event basis. Each peripheral device is controlled by peeking and poking values stored in a set of registers which is typically unique to each peripheral and which registers are mapped in the memory addressed by the host. Often these memory mapped peripherals flag activity to the host via interrupts. Given the low level at which these peripheral devices require support, interrupts must be serviced by the host in a very time-critical manner. Any delay in the servicing of interrupts can easily cause the system to malfunction.

Prior art FIG. 1 shows a schematic block diagram of a plurality of peripherals 10, 12, 14, 16, 18, 20 coupled to a host processor 22 by an interrupt driven bus 24. Inputs from and outputs to the peripheral devices 10–20 are orchestrated by the host processor 22 under guidance from system software 26 on an event-by-event basis. The software must fully account for each peripheral and how communication with that peripheral is to be handled. This gives rise to complicated task scheduling problems when there are a number of peripheral devices.

Prior art FIG. 2 shows a schematic illustration of the complexity of the host software necessary to handle a plurality of peripheral devices. Separate peripheral I/O handler routines 30 must be written to communicate with each peripheral at a very low level taking into account the register addresses and their content for each individual peripheral. Access to each peripheral must be scheduled in a main task loop 32 so that timely access to each peripheral is achieved. Data to/from each peripheral must be processed at 34 in order to be used with a data processing program 36. From the foregoing, it will be understood that it is difficult to expand the number of peripherals, because each peripheral added to the bus gives rise to new scheduling problems in the host software. Moreover, as the number of interrupt driven devices increases, so does the possibility arise that a coincidence of interrupts (collision) will cause the system to malfunction. In addition, it is possible that data expected to be available by the data processing program is not available because of a scheduling error.

In addition to scheduling problems, software in a multi-tasking (multi-threaded) system is difficult to debug. Single stepping techniques cannot be used because during any single step of the software program, peripherals serviced by interrupt handlers will be non-functional; i.e., any data that the main program was expecting to read or write will be unavailable as only a single thread can be operational during single stepping. Moreover, since peripheral devices typically require that both hardware timing and software execution be synchronized, it is extremely difficult to emulate a system for the purpose of testing and debugging.

The handling of interrupts by the processor is determined in part by the bus protocol and in part by the design of the processor itself. Typically, the bus is designed to work with a particular processor or group of processors; and peripheral devices are designed to work with a particular bus. Moreover, each processor-bus system handles interrupts in a different way. This makes it difficult, if not impossible, to adapt program code used on one processor-bus system for use on another. Thus, simple I/O functions frequently need to be re-engineered for each processor-bus system. For example, a typical "front panel" interface for a computer controlled device may require the use of over sixty peripherals in the form of switches, LEDs, LCDs, rotary encoders, sound output drivers, etc. Functions which might seem superficially simple, such as driving an LED display, can be problematic. In a multiplexed LED display, e.g., the brightness of a particular column is directly proportional to the time the column is active. If this time varies significantly, as it will easily do when driven by a processor subject to a number of interrupts, the display will flicker.

In summary, coupling peripheral devices to a host processor for real-time computing/event handling is problematic for the following reasons: scheduling is difficult, communication with peripherals is tedious and inconsistent, addition of peripherals requires major program changes, debugging is difficult, and code adaptation is difficult. Nevertheless, virtually all real-time processor systems deal with peripherals using this type of memory mapping and interrupt driven bus system where the host is required to service the peripherals on an event-by-event basis. The state of the art solution to dealing with scheduling problems is to provide a faster processor which expedites the execution of the peripheral supervision code and thus reduces the latency between concurrent interrupts simplifying the scheduling task. However, due to the criticality of interrupt scheduling, the finite speed of even the fastest processors, and the limitations of the bandwidth of the bus system, scheduling problems are still the single greatest challenge in the writing of software today. Achieving the most potential from any processor depends to a large degree on programming skill in scheduling tasks in response to interrupts. However, the complexity of even marginally efficient task scheduling is daunting to most developers.

The speed and complexity of real time processor systems also depends on the number of processes being managed by the host processor. For example, if the processor is managing input from a serial communications port, output to a printer, and manipulating a complex data set, even the fastest processor will slow dramatically and the software management of these events will be extremely complex. Even if the input from the communications port is merely being transferred as output to the printer, without manipulation, the host processor must be involved in taking the data from the communications port and then sending it to the printer.

In order to relieve the host processor from performing every task, multiprocessor systems have been proposed. Some multiprocessor systems are successful in dividing tasks among processors when the tasks are well defined. For example, it is not uncommon to divide tasks between a data processor and a signal processor in systems which deal with signals and data in real time. It is more difficult to divide data processing tasks among several data processors. The operating system must decide which tasks will be performed by which processor and must schedule tasks so that processors do not remain idle while waiting for new tasks or while waiting for other processors to complete tasks so as to provide needed results. Consequently, there has been very little success in developing a general purpose multiprocessor system and there is no standard programming language for programming a multiprocessor system.

Throughout the years there have been great advances in software development tools which simplify the writing of computer programs. Perhaps the greatest single improvement in these development tools is the utilization of "object oriented" programming languages such as "Smalltalk". Object oriented programming allows the developer to raise the level of abstraction so that complex problems can be solved at a higher level. The elements that provide for this approach are modules of code each of which is referred to as an "object". These objects can be individually debugged and re-used in other programs to shorten the time it takes to develop software. A developer can assemble a number of objects, each of which performs a specific task needed to complete the larger task performed by the software package and write a program which calls upon these objects in an appropriate order. Nevertheless, when the software accesses hardware, e.g. peripheral devices, the software must be written to "micro-manage" the hardware on an event-by-event basis.

SUMMARY OF THE INVENTION

It is therefore an object of the invention to provide methods and apparatus for distributing processing tasks between a host processor and at least one object oriented processor which relieve the host of scheduling real time interrupts.

It is also an object of the invention to provide methods and apparatus for distributing processing tasks between a host processor and at least one object oriented processor which eliminates the need for memory mapped organization of peripheral devices and replaces it with the sending and receiving of message packets.

It is still another object of the invention to provide methods and apparatus distributing processing tasks between a host processor and at least one object oriented processor which simplifies debugging of host software.

It is also an object of the invention to provide methods and apparatus for distributing processing tasks between a host processor and at least one object oriented processor which enables code to be easily adapted from one host processor and/or system to another.

It is another object of the invention to provide methods and apparatus for distributing processing tasks between a host processor and a plurality of object oriented processors which allow object oriented processors to communicate directly with each other without host supervision.

It is also an object of the invention to provide methods and apparatus for distributing processing tasks between a host processor and at least one object oriented processor which enables a consistent hardware and message interface.

It is another object of the invention to provide methods and apparatus for distributing processing tasks between a host processor and at least one object oriented processor which enables software emulation of peripheral hardware devices.

It is still another object of the invention to provide methods and apparatus for distributing processing tasks among a host processor and a plurality of object oriented processors where at least one of the plurality of object oriented processors performs at least one task for each of the other object oriented processors.

It is also an object of the invention to provide methods and apparatus for distributing processing tasks between a host processor and at least one object oriented processor where communication between the host processor and the object oriented processor is message based.

It is also an object of the invention to provide a messaging system for communications between the host processor and the object oriented processor which can be mapped into any hardware bus system.

It is another object of the invention to provide methods and apparatus for distributing processing tasks among a host processor and a plurality of object oriented processors where communications between the host processor and each of the object oriented processors do not collide.

It is still another object of the invention to provide methods and apparatus for distributing processing tasks among a host processor and a plurality of object oriented processors where communications among each of the object oriented processors do not collide.

It is yet another object of the invention to provide methods and apparatus for distributing processing tasks among a host processor and a plurality of object oriented processors where communications among the host processor and the object oriented processors is in the form of a consistent message based language.

In accord with these objects which will be discussed in detail below, the methods and apparatus of the present invention include a combination of software and hardware for distributing processing tasks among a host processor and a plurality of object oriented processors. The hardware according to the invention includes object oriented processors, each having a communications interface, an intelligent message handler (an input parser and an output message former), and a task-specific layer. According to a presently preferred embodiment, the hardware of the invention is implemented as a virtual machine by programming a processor to perform the functions of the communications interface, the intelligent message handler, and the task-specific layer. One object oriented processor will typically support a plurality of related but different specific tasks. The communications interface is coupled to a host processor via a message based communications link (comms link) which may be implemented as a serial or parallel bus.

The software according to the invention provides a high level command language which is understood by the input parser of the intelligent message handler and which is easily implemented in a host processor program. The host processor program distributes processing tasks among the object oriented processors by calling on them to perform their respective specific tasks in much the same way as an object oriented program calls on software modules. According to a presently preferred embodiment of the invention, the command language includes at least three types of messages (command, data, and exceptions/acknowledgments) to enable communications between the host and each object oriented processor. The command language optionally includes linking script messages to enable communications between object oriented processors without host processor intervention. The commands are preferably task-specific such that each implemented task responds to unique commands. The input parser of the intelligent message handler recognizes messages composed from the command language, checks syntax of the messages, checks the bounds of parameters, and identifies errors. According to a preferred embodiment of the invention, the message handler also optionally identifies errors in the comms link itself through checksum operations or other error checking algorithm such as CRC. The output message former of the message handler responds to messages from the host by providing data and/or an exception/acknowledgment.

According to a presently manufactured and practical implementation of the invention, the task-specific (functional) layer is embodied as a hardware interface. According to one presently manufactured embodiment of the invention, the object oriented processor includes support for a broad array of input and output devices including rotary encoders, switches, keypads, sensors, discrete LEDs, seven segment LED displays, and smart LCD displays. Several such devices can be coupled to the object oriented processor, via ports provided by the processor, either directly or with the use of supporting devices such as decoders, multiplexers and the like. The command language for this object oriented processor includes high level commands for initializing, reading from and/or writing to the peripherals supported by the object oriented processor. Low level operation commands to and from the peripherals are handled by the object oriented processor and converted to/from high level messages which are exchanged with the host via the comms link. This object oriented processor is designed to support a number of specific peripheral devices, but is host processor independent; i.e., the object oriented processor may be used with any host processor. Since the command language which operates the object oriented processor is implemented through a message based interface with the host, any code written to implement the command language on a specific processor is highly portable. Moreover, since the command language is very high level, the programmer need not be concerned with the low level operation of individual peripherals as the low level operation is controlled by the object oriented processor of the invention.

Systems utilizing the object oriented processors according to the invention are easy to debug and to emulate. Since the specific tasks performed by the object oriented processors are debugged prior to manufacture, the programmer need only debug communication between the host processor and the object oriented processor. Since the communication between the host processor and the object oriented processor is message based and similar in nature to the messages exchanged between software objects, the system may be entirely emulated in software even when the task specific layer of the object oriented processor involves communication with hardware peripheral devices.

According to another embodiment of the invention, the object oriented processors of the invention are addressable and several object oriented processors can be coupled to a single host via the same comms link. The command language according to this embodiment of the invention is provided with an addressing syntax for command messages. Host programs may incorporate messaging to and from two or more object oriented processors via the same comms link.

According to yet another embodiment of the invention, object oriented processors according to the invention further include a linking table and a periodic message generator which allows one object oriented processor to communicate directly with another object oriented processor without supervision by the host processor. For example, a data acquisition (DAQ) peripheral can be coupled through the object oriented processors of the invention to an output device, so that data acquired by the DAQ is continually displayed on the output device without constant host processor supervision.

According to still another embodiment of the invention, object oriented processors are arranged hierarchically so that two or more object oriented processors "inherit" functionality of another object oriented processor. A practical implementation of this embodiment of the invention, for example, is a "parent" object oriented processor which has the specific task of formatting data for display via an LED or an LCD, and two "child" object oriented processors, one of which has the task of driving an LED display and the other of which has the task of driving an LCD display. Both of the "child" processors rely on the functionality of the parent processor for display formatting.

According to yet other embodiments of the invention, the task specific layer of an object oriented processor may include other processors such as floating point processors and the like and may be used to perform specific data manipulation as called upon by the host processor. In these embodiments, the object oriented processors act as callable subroutines each of which has a dedicated subroutine processor. Moreover, the invention allows several subroutines to be executed simultaneously with the timing of subroutine tasks being governed by the sending and receiving of messages to and from the object oriented processors. A programmer may therefore use the object oriented processors to distribute processing tasks without concern about the timing or computational needs of one subroutine affecting any other part of the system.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
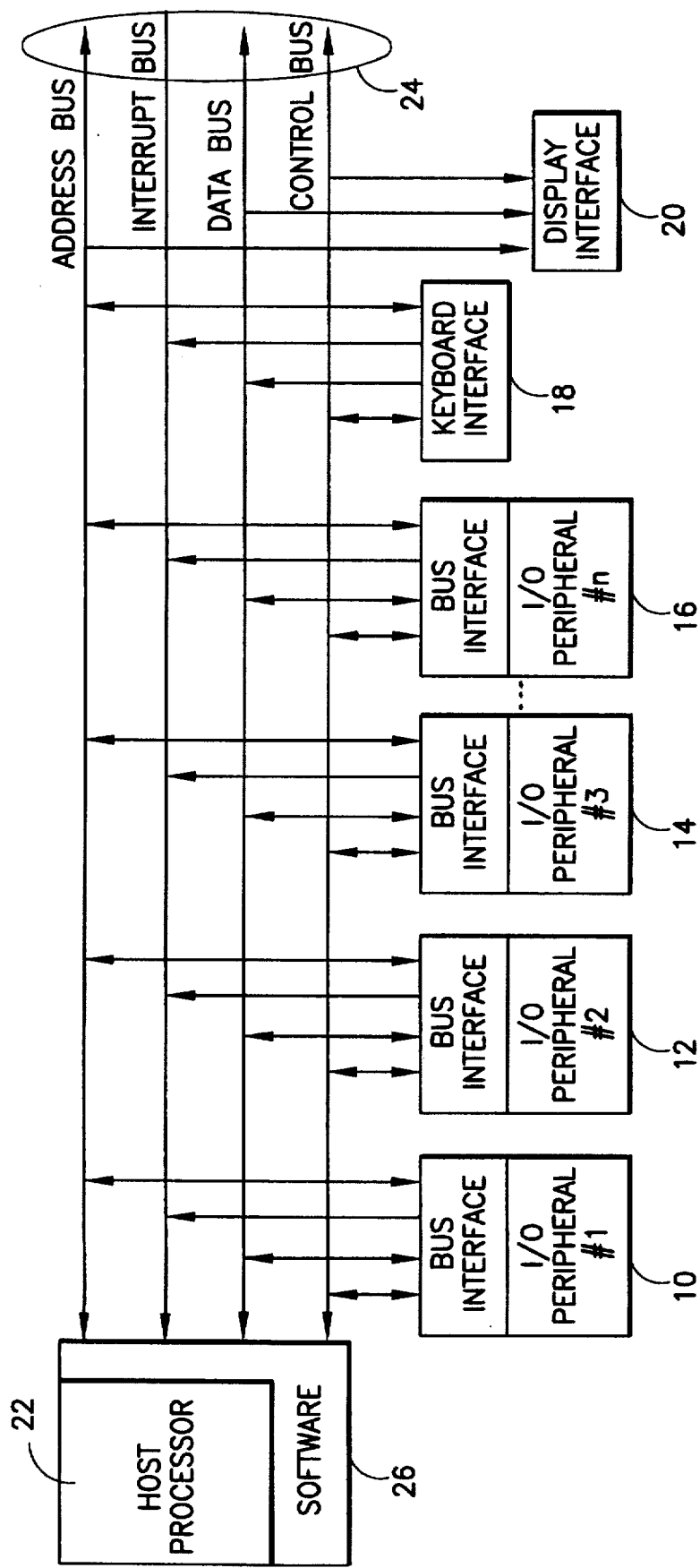
FIG. 1 is a schematic block diagram of a prior art system in which peripheral devices are coupled to a host processor via an interrupt driven bus.
Figure 2:
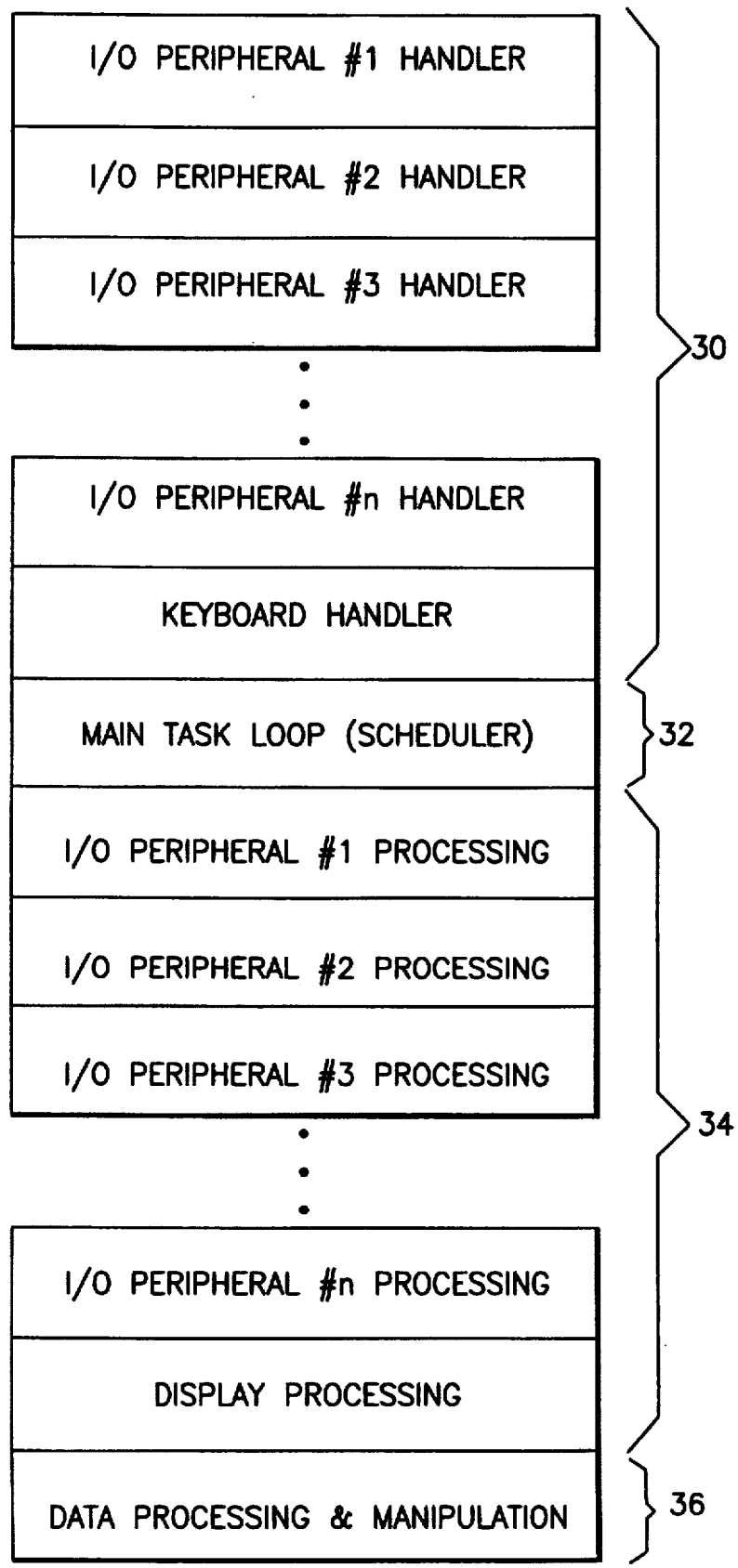
FIG. 2 is a schematic block diagram illustrating prior art system software handling of peripheral devices on an interrupt driven bus.
Figure 3:
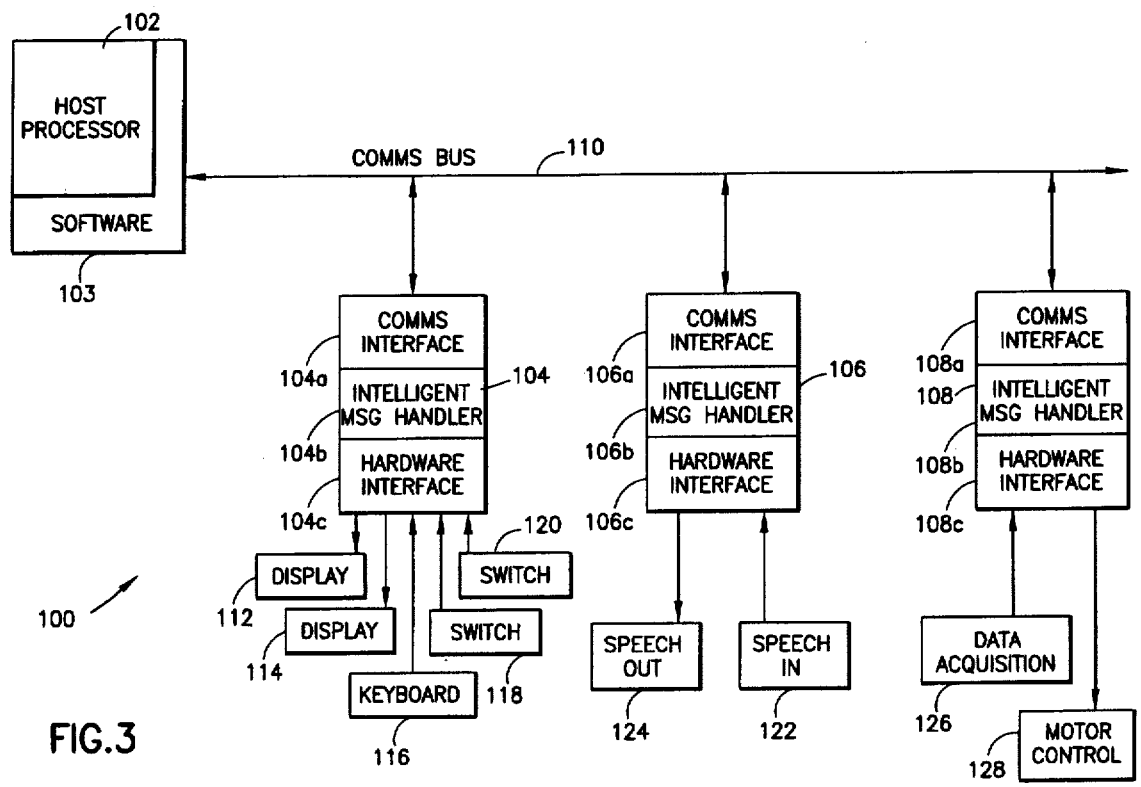
FIG. 3 is a schematic block diagram of a system according to the invention in which peripheral devices are coupled to a host processor via a communications channel and object oriented processors.

Referring now to FIG. 3, the methods and apparatus of a first embodiment of the invention are illustrated with reference to an exemplary system 100 which includes a host processor 102, and a plurality of object oriented processors 104, 106, 108 which are coupled to the processor 102 via a Comms bus 110. Each of the object oriented processors 104, 106, 108 includes a Comms interface 104a, 106a, 108a, an intelligent message handler 104b, 106b, 108b, and an task-specific layer which in the examples shown is a hardware (peripheral) interface 104c, 106c, 108c. Each object oriented processor 104, 106, 108 is bidirectionally coupled via its respective Comms interface 104a, 106a, 108a to the Comms bus 110 which is coupled to the host processor 102 in a conventional manner. According to a method of the invention, a high level command language is provided for host communication with the object oriented processors 104, 106, 108. High level messages sent by the host, as instructed by the host software 103, are interpreted by the respective intelligent message handlers 104b, 106b, 108b and used to control the respective hardware interfaces 104c, 106c, 108c to control the peripheral devices as described in more detail below. Similarly, data from the peripheral devices are received by the respective hardware interfaces 104c, 106c, 108c, interpreted by the respective intelligent message handlers 104b, 106b, 108b and transmitted to the host as high level messages.

As shown in FIG. 3, each of the exemplary object oriented processors 104, 106, 108 is preferably designed to support different types of peripherals. The first object oriented processor 104 has the task of a universal front panel controller (a user interface controller). It is designed to support peripheral devices such as LED/LCD alphanumeric displays 112, 114, a keypad or keyboard 116 (which is actually a matrix of switches), and several rotary encoders or switches 118, 120. As such, the hardware interface 104c (which is described in more detail below) is specifically designed to accommodate these peripheral devices. Moreover, the intelligent message handler 104b (which is also described in more detail below) of this object oriented processor 104 need only respond to messages appropriate for the types of peripherals serviced by it. The second object oriented processor 106 is a speech messaging controller and is designed to support a sound digitizer 122 and a digital-to-analog converter 124. Consequently, the hardware interface 106c is specifically designed to accommodate these peripheral devices. Moreover, the intelligent message handler 106b of this object oriented processor 106 need only respond to messages appropriate for the types of peripherals serviced by it. The third object oriented processor 108 (which is described in more detail below) has the task of an analog interface and is designed to support analog data acquisition devices 126 and pulse width modulation controlled analog devices such as power supplies and motor controls 128. As such, the hardware interface 108c is specifically designed to accommodate these peripheral devices. Moreover, the intelligent message handler 108b of this object oriented processor 108 need only respond to commands appropriate for the types of peripherals serviced by it.

From the foregoing, and as set forth in detail below, so long as the system 100 does not include two object oriented processors having the same type of task (i. e. handling the same type of peripherals), when the host communicates with the peripherals via the object oriented processors, there is no need for the host to provide addresses for the object oriented processors, since each object oriented processor only responds to messages appropriate to it. However, if the system contains two or more object oriented processors having the same type of task, an addressing scheme is required.

A high level command language according to a first embodiment of the invention includes three distinct message types: {command}, [data], and (exceptions/acknowledgments), where the delimiting braces "{}", brackets "[]", and parenthesis "()" designate the type of message contained therebetween. The host processor is programmed to send command messages to the object oriented processors and the object oriented processors respond with data, exceptions/acknowledgments, or nothing if exceptions/acknowledgments are turned off by the host processor. All of the commands take the form {<function>params} where "<function>" is usually a one or two digit alphanumeric name which is followed by parameters. optionally, if enabled as described in more detail below, the message format may take the form {<function>params} [checksumByte], where the checksumByte is the least significant byte of the sum of all of the characters in the message including the opening and closing delimiters, in this case the braces "{}". In either case, the intelligent message handler checks the parameters for completeness and propriety, rejects a command which does not have appropriate parameters, and returns an error message to the host. The command language also may include an addressing scheme, in which case, the message format would be {<address><function>params}.

A complete listing of the command language for an addressable user interface controller 104 is contained in Appendix A (IQC826 Specification-rev. 1.0) which also includes a listing of the status of registers after a hardware reset and a listing of error codes generated by the intelligent message handler 104b. The command language includes commands for initializing and driving LED and LCD displays, commands for addressing and reading switches and encoders, commands for creating a sound, as well as miscellaneous commands for defining signal polarity, for resetting the chip, etc. For example, a command to initialize a smart LCD display has the form {COnpq}. The parameter n refers to the display enable line (either 0 or 1). The parameter p is a hexadecimal digit which indicates the number of display lines (from 1 through 4). The parameter q is a hexadecimal digit (from 1 through 4) which indicates the width of the display lines. When q is 1, the width is 16 characters. When q is 2, the width is 20 characters. When q is 3, the width is 24 characters, and when q is 4, the width is 40 characters. This command is checked by the message handler for proper format and a two digit hexadecimal error code is generated if an error is found in the command. For example, the error code EA is given if the parameter p is out of bounds. The error code EB is given if the parameter p is not a hexadecimal digit.

A typical dialog between the host processor 102 and a user interface object oriented processor 104 without addressing is illustrated in Table 1 below.

TABLE 1

| Host Processor | {C0042} | Initialize the LCD Display on LCD Enable 0–4 lines, 20 characters wide |
| --- | --- | --- |
| | {C50} | Make display 0 the active display |
| | {D0} | Clear display 0 |
| | {D5}Display this message<cr> | Write the message "Display this message" and terminate with a CR |
| Host Processor | {O} | Requests the contents of the output buffer of the object oriented processor |
| Object oriented processor | [04] | "Scan code" 04 which represents encoder number 4 has changed its value |
| Host Processor | {N14} | Requests the contents of the counter supporting encoder number 4 and requests that the counter be reset after the contents are transmitted |
| Object oriented processor | [F9] | Transmits the contents of the counter in hexadecimal format |

As suggested above, if the system 100 were to be provided with more than one user interface controller 104, the dialog between the host processor 102 and a controller 104 would include an addressing syntax as illustrated, for example, in Table 2 below.

TABLE 2

| Host Processor | {01O} | Requests the contents of the output buffer of the object oriented processor having address 01 - (decimal) |
| --- | --- | --- |

TABLE 2-continued

| Object oriented processor | [0118] | An encoder with the address 01 (hex) and a switch having a scan code 18 (hex) connected to the object oriented processor have changed state |
| --- | --- | --- |
| Host Processor | {Z} | Global reset of all Object oriented processors |
| Host Processor | {A1} | Global enablement of acknowledge |
| Host Processor | {00C0042} | Initialize the LCD display connected to the object oriented processor having address 00 to 4 lines 20 characters wide |
| Object oriented processor | * | Acknowledgment that the display is initialized |

Another modified form of the command language may include a name, in lower case, for the object oriented processor. The name may be expressed as a single letter or as two or more letters dependent on the number of object oriented processors in the system and the amount of bus bandwidth available. For example, the minimal command to initialize an LED display with an active low row and column drive of a width of eight characters is {E008}. If the user interface object oriented processor has the name "u", this command would be written as {uE008}. If the user interface uses the address 03, this command would be written as {03uE008}.

As mentioned above, each of the object oriented processors 104, 106, 108 may be implemented as a virtual machine by programming a processor to perform the hardware functions described briefly above and in more detail below. According to a presently preferred embodiment, the object oriented processor 104 is implemented by programming an Intel 8051 processor with the code listed in Appendix B (version 0.1). The program code is preferably stored in ROM and the processor 104 and ROM are preferably supplied on a single chip. According to the presently preferred embodiment, the chip is available in three packages: 40 pin DIP, 44 pin PLCC, or 44 pin QPFP. Thirty-seven pins are used to implement the controller 104 and are identified below in Table 3.

TABLE 3

| Pin Name | Function |
| --- | --- |
| CA0 through CA3 | Encoded column address output for encoder and keyboard scanning |
| R0 through R3 | Row return lines from the encoder and keyboard matrix |
| Reset | An active reset with Schmitt input |
| RxD | The UART receive input |
| TxD | The UART transmit output |
| !INIT | An active low output signal generated immediately after a hardware reset used to strobe initialization data into the chip |
| !Status | An active low signal which signifies that there is data in the output buffer |
| Sound | Sound output pin (requires buffering to drive a loudspeaker) |
| RS | Register select output signal to LCD module |

TABLE 3-continued

| Pin Name | Function |
| --- | --- |
| DWrt | Display write pulse of user defined polarity (default is active low) |
| PWrt | Peripheral write pulse of user defined polarity (default is active low) |
| Xtal2 | Crystal oscillator output pin |
| Xtal1 | Crystal oscillator input pin |
| Gnd | Power ground pin |
| A0 | Aux port 0 |
| A1 | Aux port 1 and LCD0 enable |
| A2 | Aux port 2 and LCD1 enable |
| A3 | Aux port 3 and LED3 enable |
| A4 | Aux port 4 and LED2 enable |
| A5 | Aux port 5 and LED1 enable |
| A6 | Aux port 6 and LED0 enable |
| A7 | Aux port 7 and LED column enable |
| D0 through D7 | Data port and device hardware initialization inputs |
| VCC | Positive power supply |

The object oriented processor, as implemented with the code of Appendix B, supports thirty-two digits of seven segment LED display organized as an N column by four rows matrix. See, generally, code lines 1305 through 1323 and 2690 through 4016 in Appendix B. The number of columns scanned is user definable over the range one through eight. Left or right format, bright up digit and flashing underbar cursors, numeric and alpha decode, horizontal message scrolling, display flashing for error alert etc. are all supported. An undecoded mode is available for sixteen segment and custom format displays. The object oriented processor also supports up to two smart LCD alphanumeric displays (up to 4×40 format) using commands which are syntactically the same as for LED displays. See, generally, code lines 1402 through 1969 and 2287 through 2350 in Appendix B. The object oriented processor also supports bus write mode, enabling eight or sixteen bit peripherals to be written to directly from the Comms bus. See, generally, code lines 2579 through 2617 in Appendix B. The bus write mode may be used to support smart displays, indicators, D/A converters etc. Up to eight rotary encoders are supported with quadrature decoding, optional saturation or roll over count modes, and a high scan rate for accurate detection of rapid rotation. See, generally, code lines 2429 through 2495 and 4018 through 4369 in Appendix B. Forty-eight switches are debounced, supported by an internal FIFO and provided with selectable auto repeat. Three switches can be defined as SHIFT, CONTROL, and ALT and thereby provide a keyboard with up to 176 keypress combinations. See, generally, code lines 1001 through 1017, 2352 through 2404, 2497 through 2541, 4095 through 4111, and 4747 through 4752 in Appendix B. The object oriented processor includes a sound generator with programmable frequency and duration. See, generally, code lines 2619 through 2624 in Appendix B. The object oriented processor is available with UART/RS232 Comms interface or with a proprietary interface for coupling it to a host processor via a communications bus.

Figure 4:
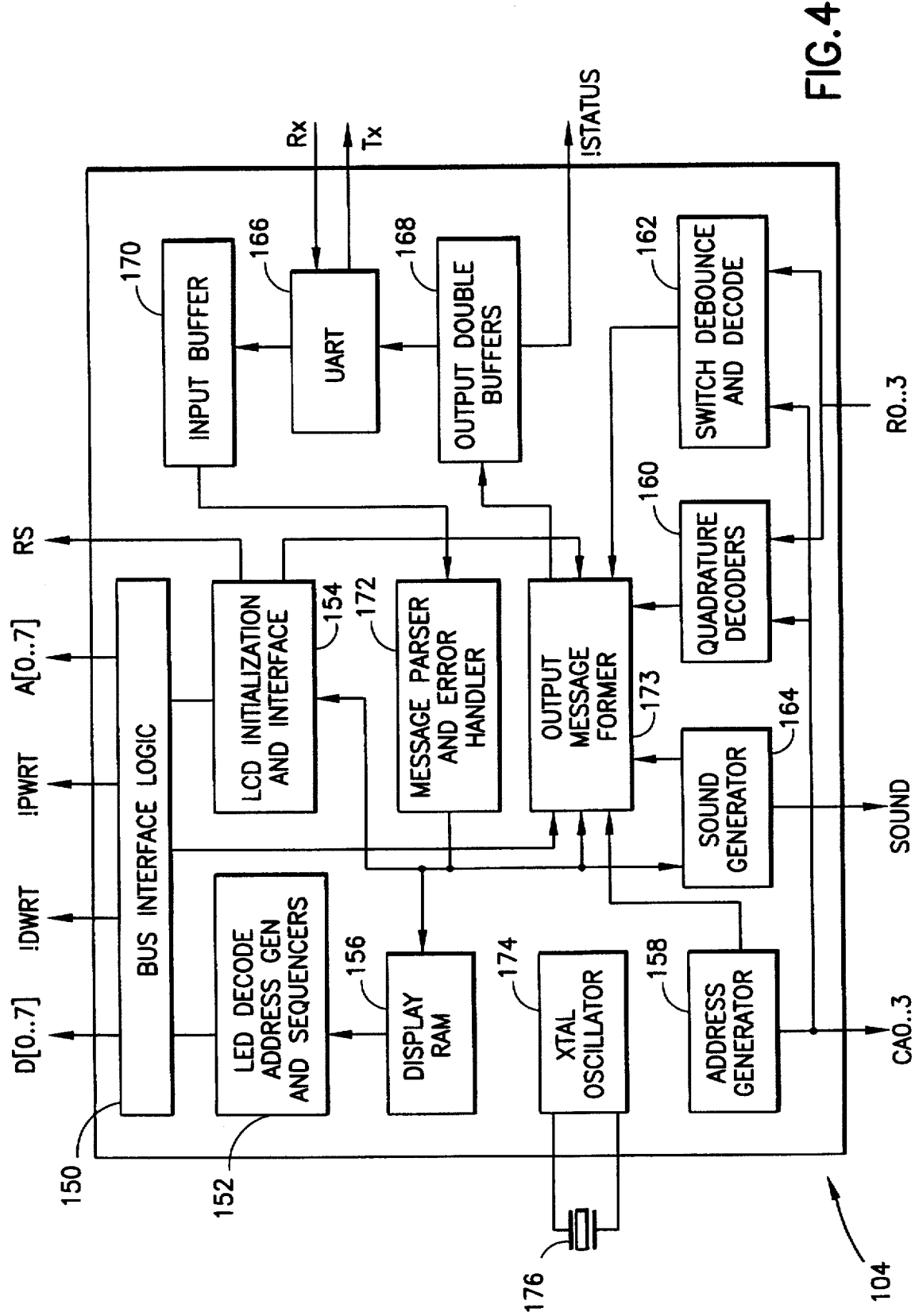
FIG. 4 is a schematic block diagram of an object oriented processor according to the invention with the specified task of universal front panel controller and remote terminal (user interface)

Referring now to FIG. 4 and with reference to Table 3 and Appendix B, a block diagram implemented by the object oriented processor 104 is seen. The processor 104 is shown to include: bus interface logic 150, LED decode address generators and sequencers 152, LCD initialization and interfaces 154, a display RAM 156, quadrature decoders 160, switch debouncers and decoders 162, a sound generator 164, and an address generator 158 which together may be considered as implementing the hardware interface 104c (task-specific layer) (FIG. 3); a message parser and error handler 172 and an output message former 173 which may be considered as implementing the intelligent message handler 104b (FIG. 3); a UART 166 with output buffers 168, and input buffers 170 which together may be considered as implementing the comms interface 104a (FIG. 3); and a crystal oscillator 174 which is typically driven by an external crystal 176. It should be appreciated that the timing of operations within the processor 104 are preferably governed by the crystal oscillator 174.

Turning first to the comms interface, it is seen that communication between the object oriented processor 104 and the host processor 102 (FIG. 3) is via the UART 166. The UART transmits data to the host from the output buffers 168 which, as discussed below, receive input device data from the quadrature decoders 160 and switch debounce and decoders 162. When input device data is present in the output buffers 168, the !Status output is activated (brought low). The !Status output can be OR'd with other such signals to create a host hardware interrupt if desired. According to the invention, however, !the Status output may be ignored. In the receiving direction, the UART 166 receives command messages from the host and places them an input buffer 170. The command messages in the input buffer 170 are retrieved by the message parser and error handler 172. The message parser and error handler 172 interprets the command messages and if they contain an error (see Appendix A) an error code is sent via the output message former 173 to the output buffers 168 for transmission to the host. If the messages do not contain errors, they are interpreted and used to operate on the functional layer, e.g. to control the output devices. In particular, in response to the command messages, the message parser 172 controls the LCD initialization and interface 154, the display RAM 156, the address generator 158, and the sound generator 164. If a display is required on an LED peripheral displays (e. g., display 112), the message parser writes to the display RAM 156 which continually refreshes the LED decode address generator and sequencers 152. The LED decode address generator and sequencers 152, in turn, cause the bus interface logic 150 to drive and output appropriate data (whether initialization data or otherwise) on outputs D0 through D7. Likewise, if a display is required on an LCD, the message parser 172 drives LCD initialization and interface block 154 which likewise causes the bus interface logic 150 to drive and output appropriate data on outputs D0 through D7. Whenever outputs D0 through D7 are being written, the !DWRT display write pulse is activated. The !PWRT peripheral write signal is activated immediately after a write to the data port with the {W0pq} command. Outputs D0–D7 act as an eight bit bus and support up to two LCD displays and four LED displays. When more than one display is used, the outputs A0–A7 are used to enable a particular display. See Table 3, above. Alternatively, the outputs A0–A7 can be coupled to a single 8-bit peripheral device and the outputs D0–D7 can be coupled to a single 8-bit peripheral device. As another alternative, the outputs D0–D7 and A0–A7 can be coupled to a single 16-bit peripheral device. If an LCD module is connected to the outputs D0–D7, the RS register select output is coupled to the LCD module. The RS signal is defined by LCD manufacturers and distinguishes between display control information (RS is low) and display data (RS is high).

A sound generator 164 is provided and controlled by the message parser and error handler 172. The sound generator produces sounds having a pitch and duration according to a command from the host processor.

An address generator 158 provides the encoded column address outputs CA0 through CA3 for encoder and keyboard scanning and the return lines R0 through R3 from encoders and keyboard matrices are supplied to quadrature decoders 160 and switch debounce and decoders 162 which also receive input from the address generator 158. Keyboards and encoders are coupled to the column address outputs CA0–CA3 and to the row return lines R0–R3. The return row lines are scanned for each column and the scan codes are decoded by the quadrature decoders 160 and the switch debounce and decoder 162. Standard switches and keyboard switches are debounced by double scanning. The depression or release of a switch is registered only when the state of the switch is stable for two successive scans. When the state of any switch or encoder is changed, the scan code for the switch or encoder is entered into the output buffer 168 via the output message former 173. When data is placed in the output buffer, the !Status output is activated and this signal may be used to generate hardware interrupts, if desired.

In addition to error messages and data, the output message former 173 optionally provides the output buffers 168 with acknowledgement messages from the bus interface logic 150, the address generator 158, and the sound generator 164 to acknowledge output messages from the host.

Details regarding the physical coupling of specific hardware devices (encoders, switches, and displays) are set forth in Appendix A which includes electrical specifications and timing characteristics.

Figure 4A:
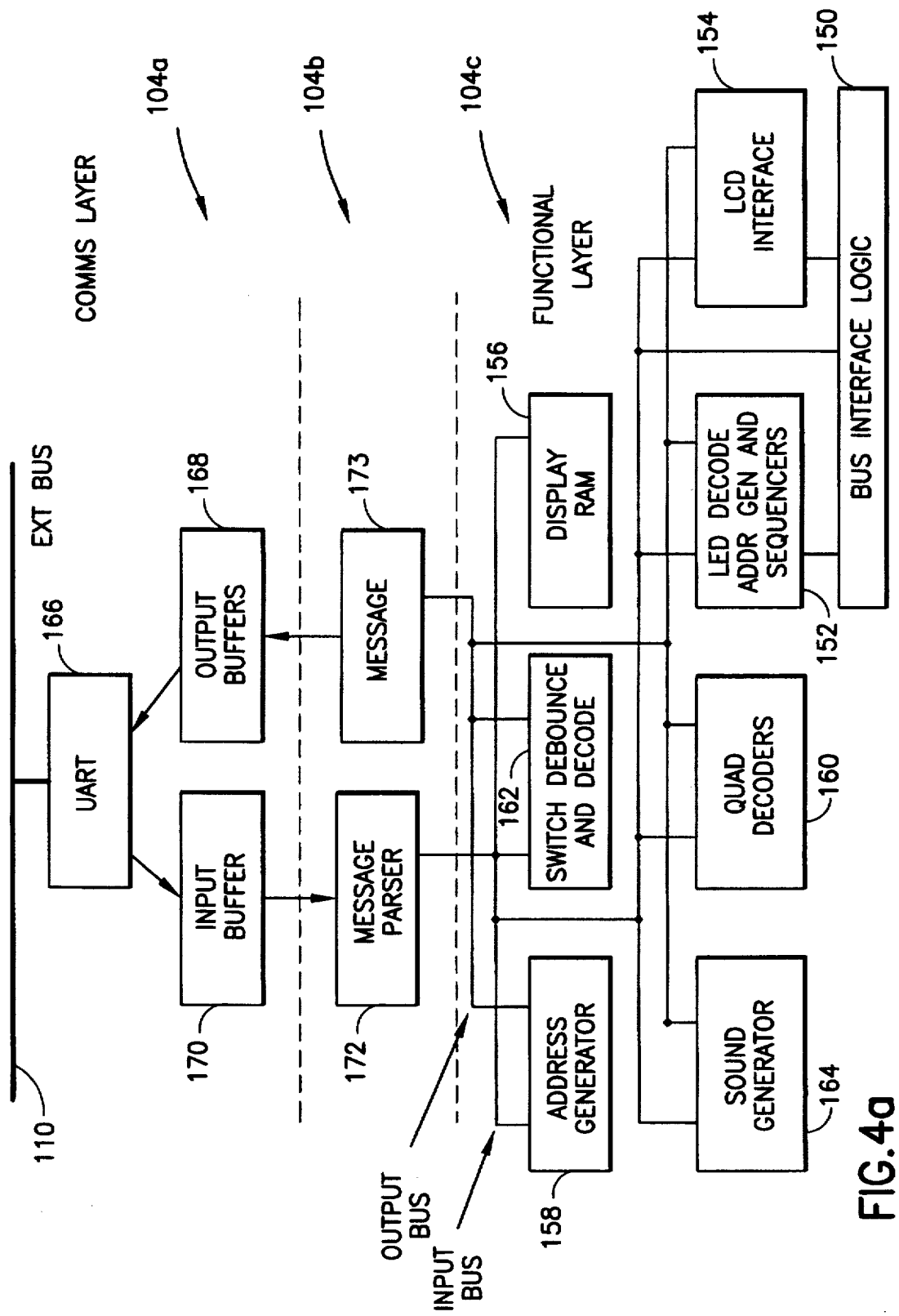
FIG. 4a is a schematic block diagram of the object oriented processor of FIG. 4 shown in a layered organization according to the invention.

As mentioned above, the object oriented processor 104 is preferably implemented as a virtual machine and therefore, the diagram of FIG. 4 is somewhat conceptual. Moreover, as shown in FIG. 3, the object oriented processors according to the invention are conveniently described as having three "layers", i.e. a communications interface layer 104a, a message handling layer 104b, and a hardware interface or functional layer 104c. Turning now to FIG. 4a, the functional elements of FIG. 4 are shown arranged according to the layers described above. Thus, the communications layer 104a includes the UART 166, the output buffers 168, and the input buffer 170. The message handling layer 104b includes the message parser 172 and the message former 173. The functional layer 104c includes the bus interface logic 150, the LED decode address generators and sequencers 152, the LCD initialization and interfaces 154, the display RAM 156, the quadrature decoders 160, the switch debouncers and decoders 162, the sound generator 164, and the address generator 158.

As mentioned above, the host processor operating system is easily programmed to communicate with the object oriented processor. Code written for the host processor may call on comms and interface routines to communicate with the object oriented processor 104 using the command language listed in Appendix A. The comms and interface routines are provided as code libraries which the programmer can easily include in a standard C-program for the host processor. Sample code libraries COMM51.C, COMM51.H, INTF51.C, INTF51.H, UTILS.C, UTILS.H, and GLOBALS.C are attached hereto as Appendix C. The code fragment below illustrates a portion of the code used by a host processor to control the user interface for a frequency synthesizer.

```
while(1) {
    poll816( );
    if(encoderOFlag) {
        encoderOFlag=O; //reset the flag
        writeEncoderFreq(readResetEncoder('O'), &fSynth);
    }
    while(c=popSwitch( )) {
        switch(c) {
            case MENUKEY:
                displayMenu( );break;
            case LEFTKEY:
                editFreq(RHS,&fSynth);
                writeFreq(&fSynth);
                writeSynth(fSynth);
                break;
            case RIGHTKEY:
                editFreq(LHS,&fSynth);
                writeFreq(&fSynth);
                writeSynth(fSynth);
                break:
            case SCANKEY:
                reqSweep( );
                break;
            default:
                makeErrorSound( );
        }
        if(c) {
            ledFormat(LEDDISPLAYO,LEFT,NUMERIC);
            writeDisplay(fSynth);
        }
    }
}
```

The code fragment listed above is the main task handler for the frequency synthesizer. The "while(1)" loop executes its contents forever. The "poll816()" instruction gets the status of the object oriented processor using the {O} command described above and decodes the response. The complete code for the "poll816()" instruction can be found in the COMM51.C listing in Appendix C. In this example only a single encoder (encoder0) is used and it is therefore only necessary to detect its change of state with the "if(encoder0 . . . " statement. If the encoder's flag is set (state has changed), it is reset by the host so that subsequent changes will be detected. The value of the encoder is then read with the "readResetEncoder('0')" statement. Both the display and the "freq synth" hardware are updated with the "writeEncoderFreq . . . " instruction.

The switch scan codes obtained with the "poll816()" instruction are stored in a stack and are retrieved from the stack using the "popswitch()" function which is coded in the COMM51.C listing in Appendix C. When this function returns a zero, this is an indication that there are no more switches left to be processed. Thus, the "while(c=popswitch())" loop gets switches from this stack, determines what kind of switch they are and then takes the appropriate action. The labels MENUKEY, LEFTKEY, etc. would be defined in another portion of the code (not shown) with numeric values corresponding to scan codes returned from the stack. The "switch(c)" statement looks at the scan code, in this case "c", and jumps to the label having the matching value. If the scan code does not match any label value, the statement jumps to "default" and makes an error sound. If the switch scan code matches the value of the label MENUKEY, e.g., the statement "displayMenu" calls upon routines to list a menu. The LEFTKEY routine moves the display cursor to the left, etc. The "if() . . . while()" loop continues so long as non-zero values return from the stack.

As explained above, each object oriented processor according to the invention is designed (programmed) with a specific functionality (task-specific layer), for example to support specific kinds of peripherals. The object oriented processor 108 (FIG. 3), for example, is programmed with the functionality of a smart analog interface which is used to interface with analog devices such as motors and analog sensors. The analog interface of the processor 108 is implemented in much the same way as the user interface of the processor 104 described above with reference to FIG. 4. It will be appreciated, however, that the functionality of the pins on the chip implementing the analog interface 108 will be different from the functionality of the pins on the chip implementing the user interface 104.

A presently preferred embodiment of the analog interface processor 108 utilizes a Phillips 80576 processor which is programmed to achieve the functionality described below with reference to FIG. 5. The object oriented processor 108 is available in 44 pin QPFP, 44 pin PLCC, or 40 pin DIP packages. Table 4 is a listing of the pins and their functions in the analog interface object oriented processor 108.

TABLE 4

| Pin Name | Function |
| --- | --- |
| AVCC | Analog Vcc supply voltage |
| AVSS | Analog Vss supply voltage |
| AIN0 through AIN5 | Six channels of ten bit analog data acquisition |
| !RESET | Active reset |
| RxD | The UART receive input |
| TxD | The UART transmit output |
| !INIT | An active low output signal generated immediately after a hardware reset used to strobe initialization data into the chip |
| ST/ENAB | Status or Enable |
| CMP+ | Analog comparator input |
| CMP− | Analog comparator input |
| !WR | Parallel interface write signal |
| !RD | Parallel interface read signal |
| !CS | Parallel interface chip select signal |
| Xtal2 | Crystal oscillator output pin |
| Xtal1 | Crystal oscillator input pin |
| Gnd | Power ground pin |
| GD0 through GD3 | General purpose digital outputs |
| PWM0 and PWM5 | PWM output |
| D0 through D7 | Remote data port or parallel connection to host |
| VCC | Positive power supply |

Figure 5:
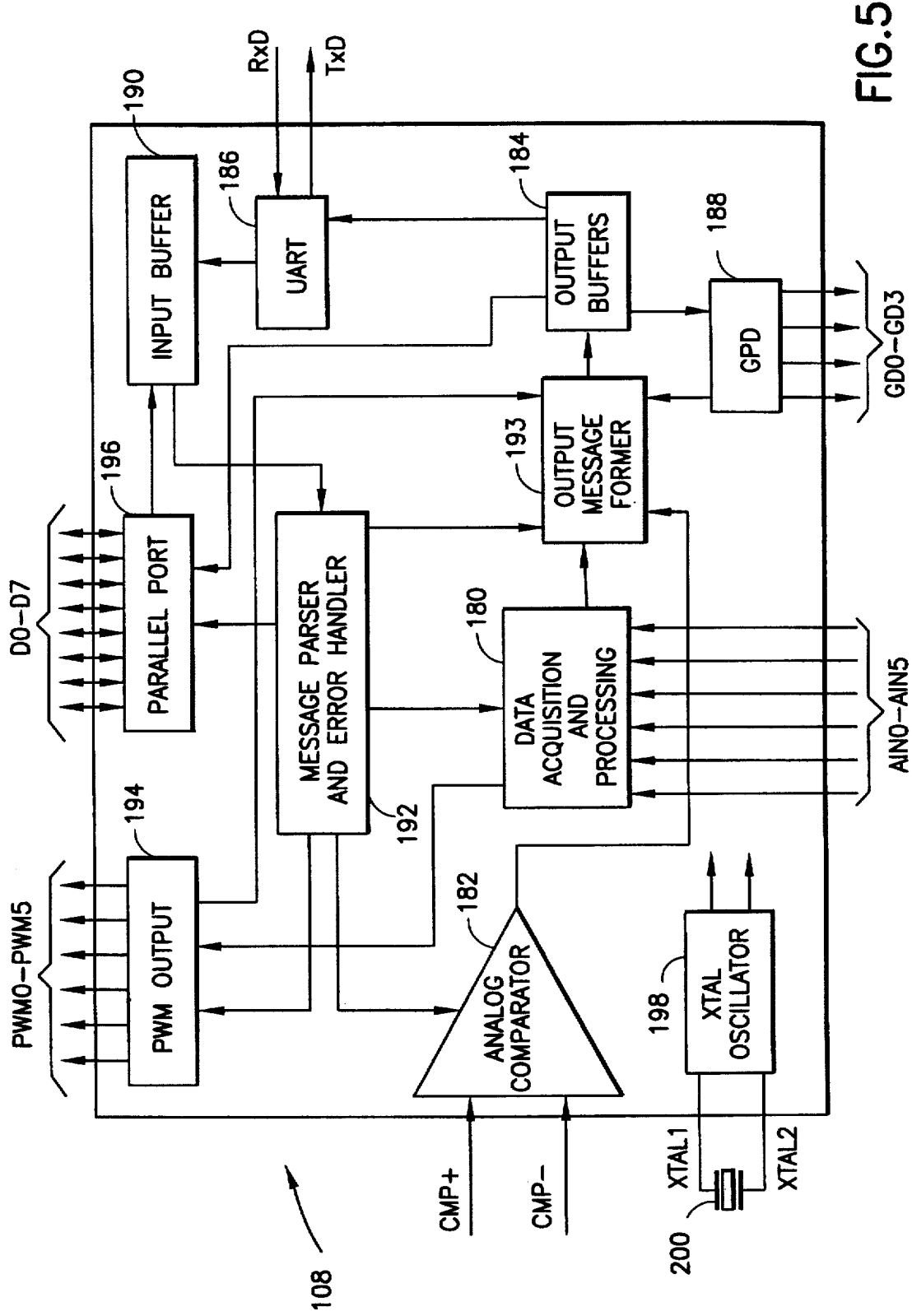
FIG. 5 is a schematic block diagram of an object oriented processor according to the invention with the specified task of an analog interface.

FIG. 5 shows a schematic block diagram of the analog interface object oriented processor 108 according to the invention. Referring now to FIGS. 3 and 5, the communications interface 108a (FIG. 3) is implemented by the UART 186, the output buffer 184, the input buffer 190, and if desired, the parallel port 196. The intelligent message handler 108b is implemented by the message parser and error handler 192 and the output message former 193. The hardware (peripheral) interface (task specific layer) 108c is implemented by the data acquisition and processing block 180 ("DAQ"), the analog comparator 182, the PWM output 194, the parallel port 196, and the general purpose digital outputs 188. Timing of the functions implemented on the chip is regulated by a crystal oscillator 198 which is coupled to an external crystal 200.

The presently preferred embodiment of the analog interface object oriented processor 108 according to the invention supports six channels (pins AIN0 through AIN5) of analog data acquisition, with twelve bit A/D resolution and programmable signal conditioning. Signal conditioning functions include root mean square (rms) value, average value, positive and negative peak detect, gain, and modulus (rectify). All computations are preferably processed with thirty-two bit resolution for high accuracy. Six PWM outputs are provided with optional on-chip closed loop processing.

The maximum PWM output frequency in the provided embodiment is 23 KHz. Four general purpose digital outputs, GD0 through GD3, are provided and can be user configured to generate local clocks or measure pulse widths. A parallel port, pins D0 through D7, can be used as a remote digital I/O port with separate read and write signals, or as a parallel port connection to the host with standard read (!RD), write (!WR), and chip select (!CS) signals.

Referring now to FIG. 5 and with reference to Table 4, messages received from the host processor via the UART 186 are placed in the input buffer 190 and read by the message parser and error handler 192 which controls the hardware (peripheral) interface. If a message from the host contains an error, it is handled as described above with an error message being sent to the host (via the output buffer 184 and UART 186). Error-free messages are interpreted by the message parser 192 and used to control the DAQ logic 180, the comparator 182, and the output buffers 184, as well as to send commands from the host processor to direct the message parser and error handler 192 to alter the output frequency of the PWM output 194, to configure the output of the digital outputs 188, to read from or write to the parallel port 196, etc. An exemplary command set for use by the host processor to control the analog interface processor 108 is provided in the attached Appendix D (Command Set to the Analog Interface Object).

As suggested above, the analog interface object oriented processor 108 communicates with external analog devices. Thus, the analog interface processor 108 is provided with an analog comparator 182 which receives input through pins CMP+ and CMP−, and a data acquisition and processing ("DAQ") logic block 180 which receives six channels of analog inputs from pins AIN0–AIN5 and A/D converts the analog inputs to a ten bit resolution. According to the presently preferred embodiment, each of the six channels of the DAQ 180 is provided with an output buffer having a depth of eight bytes (four samples). Samples are returned as sixteen bit signed integers which are transmitted to the host in ASCII code as four hexadecimal digits via the output message former 193. The DAQ 180 is configurable to condition incoming signals in several ways. The presently preferred embodiment includes conditioning signals to detect rms value, average value, positive and negative peak values, gain, and modulus. The analog interface processor 108 can be operated in an open loop (measurement mode) or in a closed loop (controller mode). When in the closed loop mode, input to the DAQ logic 180 is conditioned and then directed to the PWM output 194. When in the open loop mode, input to the DAQ logic 180 is conditioned and placed in the output buffers 184 by the output message former 193. It should be appreciated that any output from the DAQ 180 and the comparator 182 which are placed in the output buffers 184 can be transmitted to the host processor via the UART 186 as described above with reference to the processor 104.

The eight bit bidirectional parallel port 196 may be used as a remote data port or may be used to provide a parallel connection to the host processor. This port may also be used as a remote I/O expander when the processor 108 is coupled to a host via a serial bus. The byte wide parallel port effectively adds control pins to the host and at a remote location as well.

In addition to error messages and data, the output message former 193 optionally provides acknowledgement messages from the DAQ, the comparator, the GDP, and the PWM for transmission to the host via the output buffers and the UART.

Figure 6:
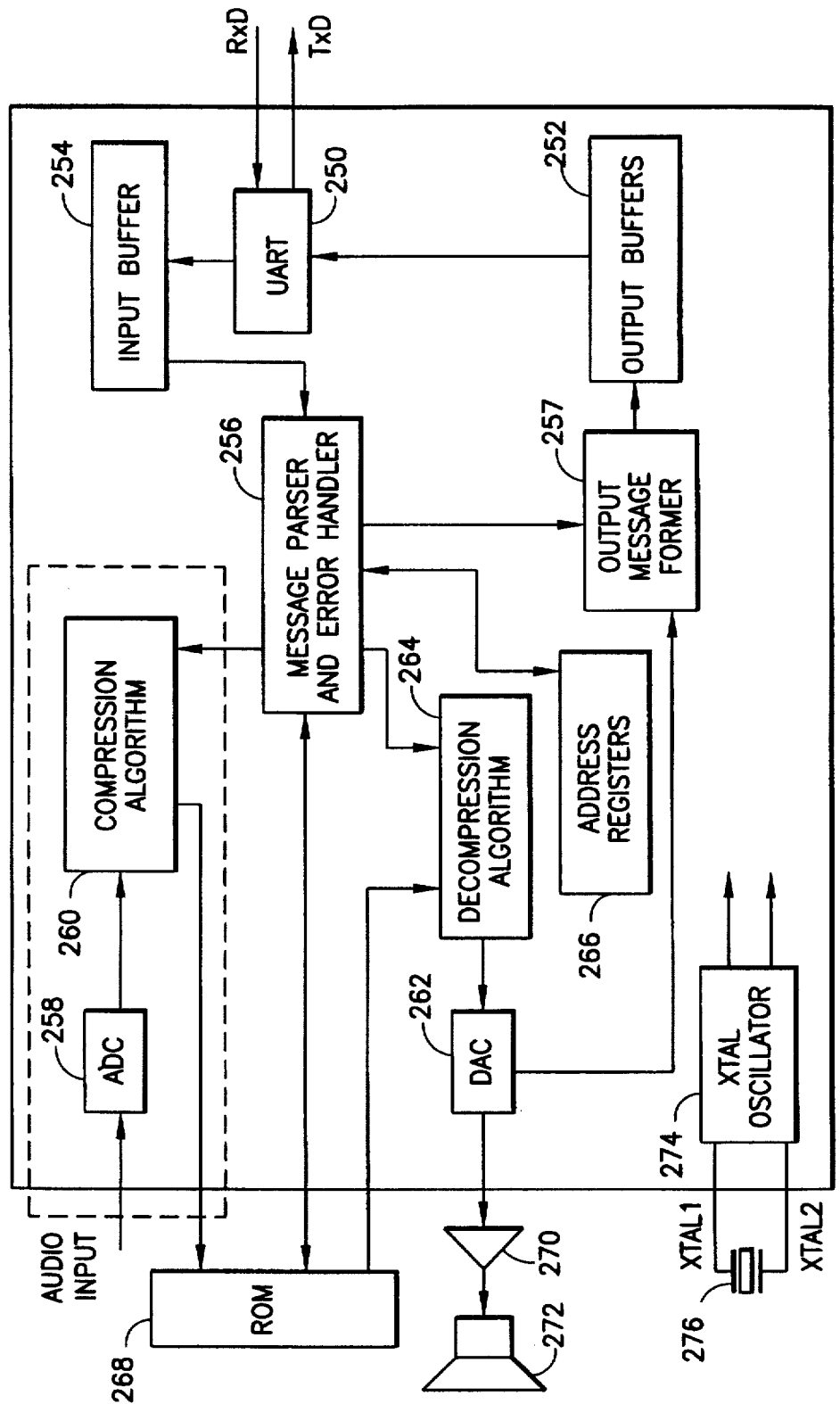
FIG. 6 is a schematic block diagram of an object oriented processor according to the invention with the specified task of a speech processor.

As mentioned above with reference to FIG. 3, an object oriented processor 106, according to the invention is provided with speech processing functionality. FIG. 6 shows a schematic block diagram of such an object oriented processor according to the invention. As with the processors described above, the speech processor 106 is preferably implemented as a virtual machine by programming a general purpose processor to achieve the functionality described below.

Turning now to FIG. 6, and with reference to FIG. 3, the communications interface 106a (FIG. 3) is implemented by the UART 250, the output buffers 252, and the input buffer 254. The intelligent message handler 106b is implemented by the message parser and error handler 256 and the output message former 257. The hardware interface 106c (task specific or functionality layer) is implemented by the analog to digital converter (ADC) 258 having an associated compression algorithm 269, the digital to analog converter (DAC) 262 having an associated decompression algorithm 264, and address registers 266. In addition, the functionality of this processor will typically require off-chip memory 268, preferably in the non-volatile form of ROM, EPROM, or static RAM. Moreover, in its primary mode as an audio player (rather than an audio recorder), an off-chip amplifier 270 and speaker 272 will also be required. Timing of the functions implemented on the chip is regulated by a crystal oscillator 274 which is coupled to an external crystal 276.

Communications and message handling in the speech processor is substantially the same as described above, but with functionally unique commands. The processor 106 is provided with an audio input for recording speech, although it is anticipated that most applications will require only one recording session after which the audio input will not be used again. In any event, the audio input is coupled to the ADC 258 which converts analog audio signals into digital signals which are highly compressed using the compression algorithm 260. In applications which require only record once and play many times, the ADC and compression algorithm may be provided off-chip in a PC or the like (not shown) as suggested by the dotted line surrounding the ADC and the compression algorithm. Recorded and compressed messages would be transferred to the ROM chip 268 by the PC and the ROM chip then coupled to the processor 106. Compressed digital signals are stored in the memory 268 and addressed as pages (each of which has a duration of about one second of decompressed audio) which are referenced in the address registers 266. Pages of compressed audio may be selectively recalled from memory 268, decompressed using the decompression algorithm 264, and converted to an analog signal using DAC 262. The analog output from the DAC 262 may be amplified using the amplifier 270 and output through the speaker 272. The presently contemplated use of the processor 106 is to store and retrieve common phrases. Consequently, the commands used to operate the processor include a PLAY command with parameters of start. page and stop. page. For example, with page addresses of five (5) hex digits, a play command might take the form {Pabcdezyxwv} where abcde is the address of the first page and zyxwv is the address of the last page. By concatenating phrases from different memory pages using sequential PLAY commands, different audio messages may be created.

The output message former 257 in FIG. 6 is used to provide error messages and, optionally, to provide acknowledgment messages for transmission to the host via the output buffers 252 and the UART 250.

As mentioned above, the methods and apparatus of the invention allow relatively easy software simulation of a distributed processing system and thus allow for rapid debugging of the system and the development of system software. An example of software simulation of the user interface 104 (FIG. 3) can be gleaned from the C code listing in Appendix E which provides a demonstration of the capabilities of the object oriented processor having user interface functionality.

Those skilled in the art will appreciate that the message based communication system provided by the invention allows for rapid debugging of host software and simulation of the object oriented processors. Since all communications between peripheral devices and object oriented processors are pre-tested and since the bus system used for the host and the object oriented processors is also pre-tested, it is only necessary to simulate the communications between the host and the object oriented processors in order to de-bug host software. Since the communication between the host software and the object oriented peripherals is message based, it operates in the same way as software to software communication and the developer is freed from software to hardware communication concerns.

One method of system development according to the invention is to couple one or more object oriented processors via a communications bus (e. g. serial port) to a development PC and to write the host software on the development PC. The system can be debugged in real time because of the message based communication between the host software and the object oriented processors.

A presently preferred method of system development utilizes full software simulation. Full software simulation is easily implemented since the object oriented processors are easily emulated as virtual machines in software. For example, in the case of the user interface 104, the code listed in Appendix B may be used as a guide to create virtual machine software which can run on a development PC. Those skilled in the art will appreciate that the hardware devices such as LEDs, LCDs, switches, etc can also be simulated as a graphic interface on the host computer, thereby greatly simplifying system software development.

Figure 9:
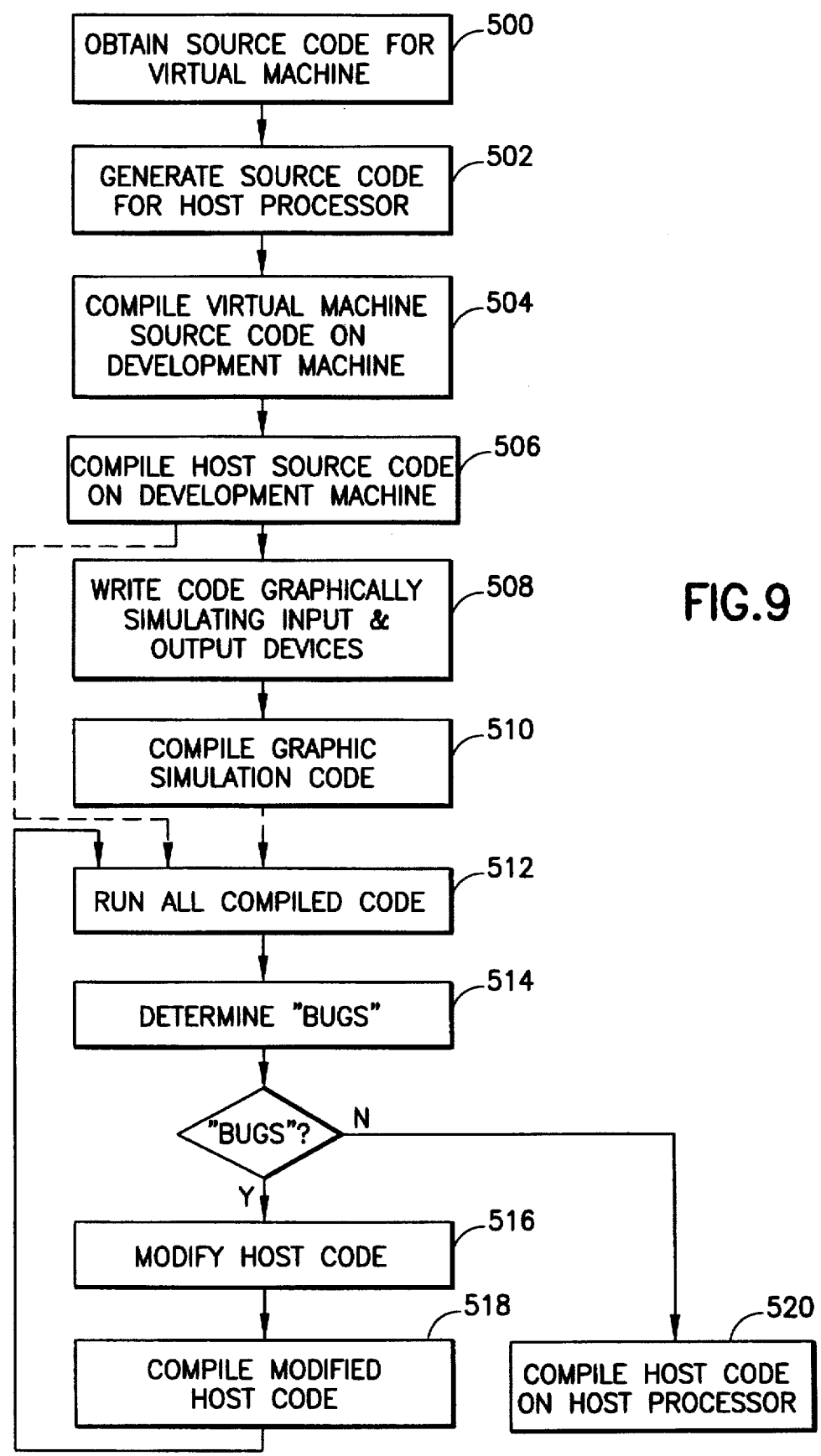
FIG. 9 is a flow chart illustrating a method of debugging host software according to the invention.

FIG. 9 illustrates the steps in an example of development of host software utilizing the de-bugging and simulation features of the invention. First, the object oriented processor is realized as a virtual machine and source code for the virtual machine is obtained at 500. A first generation of source code for a host processor is written at 502. The virtual machine code is compiled or interpreted at 504 to run on a development computer. The first generation host source code is similarly compiled or interpreted at 506 to run on the development computer. Code for graphically simulating input and output devices such as LEDs, switches, etc. is optionally written at 508. The graphical simulation code is compiled or interpreted at 510. All of the compiled/interpreted code is run on the development computer at 512 using known de-bugging methods. In addition, the code for the object oriented processor aids in de-bugging by providing error messages as described above when messages from the host software have incorrect syntax or invalid parameters. Bugs in the host software are determined at 514. Modified host code is written at 516. The modified code is compiled/interpreted at 518. The process returns to 512 to de-bug the modified host code. Steps 512, 514, 516, and 518 are repeated until no bugs remain in the host code. The host code is compiled/interpreted to run on the host processor at 520. The object oriented processor is implemented as a virtual machine using the code obtained at 500 or is implemented as a circuit having the functionality of the code obtained at 500, or is implemented as a virtual machine using the code obtained at 500 as a guide.

Those skilled in the art will appreciate that the code for the object oriented processor(s) and for the host is preferably written in a single object oriented programming environment. The code for each object oriented processor would be written as a class and the code for the host processor would be written as the main.

Thus far, a first generation of object oriented processors has been described together with methods of connecting peripherals to a host processor using the object oriented processors. These methods and apparatus relieve the host processor of scheduling real time interrupts for multiple peripherals by placing all interrupts on the single comm bus, allow faster and easier development of system software, enable portability of system software, and facilitate debugging. A second generation of object oriented processors, which will be described below, achieves all of the functionality of the first generation described above and also allows for direct communication between object oriented processors without continuous host processor supervision. This additional functionality is achieved by providing an object oriented processor with a periodic message generator (PMG), a link table, and linking scripts. The link table and the linking scripts are stored in memory locations in the object oriented processor and may be downloaded to the object oriented processor from the host processor. The PMG is coded into the programming of the object oriented processor and may be activated by the host processor to locally generate messages within the object oriented processor which would normally come from the host processor. The message contents, the number of repetitions of the message, and the interval between repetitions of the message by the PMG are user selectable through commands from the host processor. It will be appreciated that if the object oriented processor is implemented as a circuit or a gate array, the PMG will be hard wired accordingly rather than programmed in software.

According to a presently preferred embodiment of the invention, the link table contains space for jump vectors corresponding to each command which is understandable by the object oriented processor. Each jump vector points to the memory location of a downloaded linking script associated with the command, if a linking script linked to the command has been downloaded. When a script is downloaded to the object oriented processor, the object oriented processor assigns a new jump vector in the link table to the memory location starting point of the downloaded script. When a message is interpreted by the message parser, it is passed to the link table to determine if there is a script associated with the command. If there is, the script is executed (either before or after) the functional layer executes the command. Scripts may be defined as either pre-command or post-command scripts in order to define when the script will be executed. According to a preferred embodiment, post-command scripts are processed through via the output message former which passes output messages to the link table to determine the presence of a post-command script.

Figure 7:
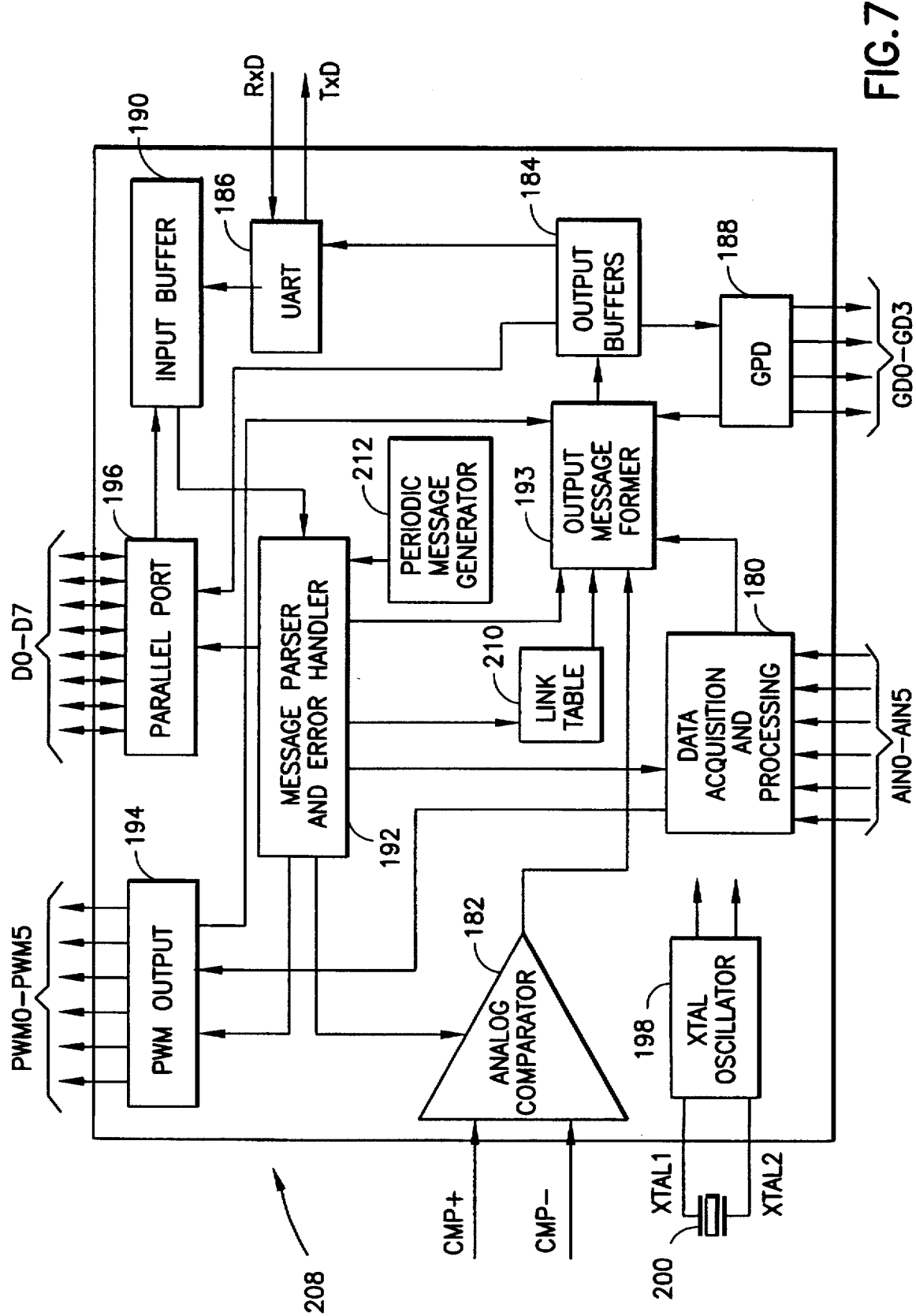
FIG. 7 is a schematic block diagram of an analog interface similar to the interface shown in FIG. 5, but with the added functionality according to another embodiment of the invention.

Turning now to FIG. 7, a second generation object oriented processor is exemplified in a smart analog interface 208 which includes all of the functionality of the analog interface 108 described above. In addition, the analog interface 208 is provided with a link table 210 which is, in effect, a list of starting memory locations of storage space into which scripts can be downloaded from the host processor. The link table is coupled to the message parser and error handler 192 so that scripts may be executed locally. Preferably, the interface 208 is also provided with a periodic message generator 212 which is, in effect, a timer and associated processing for the local generation of message sequences.

As mentioned above, the PMG, link table, and linking scripts allow an object oriented processor such as the analog interface 208 to be instructed to communicate directly with another object oriented processor. For example, the object oriented processor 208 described with reference to FIG. 7 can be instructed by the host processor to send data directly to a smart user interface (object oriented processor 104 in FIG. 4) via the Comms bus or via another bus. To effect this functionality, the host processor will download a linking script to processor 208 and activate the PMG 212 to locally generate messages periodically. According to the invention, an extended command language syntax is provided for downloading linking scripts. Appendix F (Message Format Specification for the IQ1000 Bus-Rev 0.3) includes a description of the extended command language syntax used for this purpose. The syntax takes the form, for example, as shown in the following script message: A@{ch0,1, printf ("Ue5{0\}–Uf0–Uf5{The RMS value =%f\}–", ch0Value) ;}!–. The first character A is name of the object oriented processor to which the message is sent. An optional address number may precede the name character. The @ character identifies the message as a linking script. The first { character identifies the start of the parameter field. The first parameter, ch0, identifies the primary message to which the script will be linked. The second parameter, 1, indicates that the script is to be post-executed (rather than pre-executed) once the primary message has been executed. The string of characters from printf through the last } character is the script itself which is shown by example in a high level language. In actual practice, the script may be written in machine code and transmitted as a hex string for the target object oriented processor. If the target object oriented processor is provided with a code interpreter, then the script could be a source code script such as shown in the example. The ! character in the script message is the reserved name for the host and indicates the identity of the sender of the message. The final – character indicates the end of a message packet.

At any given time, the link table may contain jump vectors to several scripts or no scripts. The link table will default to "no scripts" when the object oriented processor is initialized or reset.

In the example given above, it is not necessary for the object oriented processor 104 to have a PMG or linking table since it is only receiving messages from the comms link as if they had come from the host processor. However, if the analog interface object oriented processor 104 is provided with the capability of executing linking scripts, the example above may be carried further to include, for example, the speech processor 106. For example, the host may download a script to the analog interface 104 directing it to send messages to the speech processor 106 to speak the information displayed by the analog interface.

From the foregoing, it will be appreciated that the object oriented processors according to the invention are not limited to the examples given. The object oriented processors may be used to distribute processing tasks in any processor system. For example, those skilled in the art will appreciate from the foregoing that a desktop multimedia computer may be designed using the object oriented processors according to the invention. Separate object oriented processors could be programmed with functionality for controlling a disk drive, a joystick, and a video display, for example. The host processor could download linking scripts directing the disk drive processor to periodically send video data from the disk drive to the video display processor and directing the joystick processor to periodically send messages to the video display processor indicating the position of the joystick. The video display processor may be programmed to move an overlay such as a sprite or group of sprites on the video display in response to messages from the joystick processor. It will therefore be appreciated that a relatively complex programming task for a multimedia game, for example, may easily be distributed into several relatively simple tasks which are carried out by separate object oriented processors.

Figure 8:
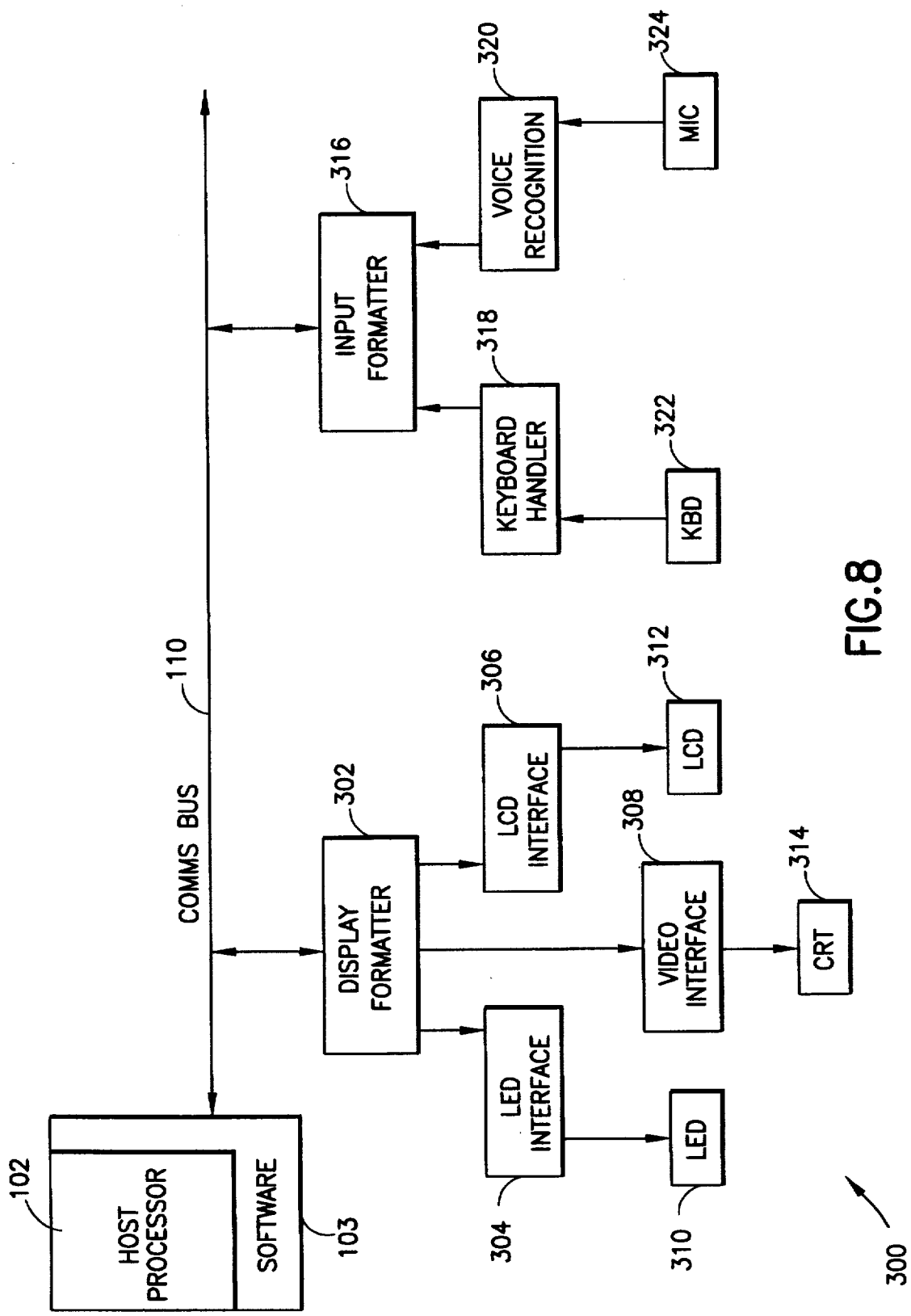
FIG. 8 is a schematic block diagram of another embodiment of the invention in which two object oriented processors share the functionality of a third object oriented processor.

Furthermore, it will be appreciated that processing tasks may be distributed in many different ways utilizing the object oriented processors of the invention. For example, as shown in FIG. 8, a distributed processing system 300 according to the invention may be implemented using a host processor 102 with software 103 and a comms bus 110 as described above. Several hierarchies of object oriented processors may be provided. For example, the display formatter object oriented processor 302 may be programmed to preformat a display for use by a number of different display devices. The preformatted display is adapted to an LED 310 by the LED interface object oriented processor 304, to an LCD 312 by the LCD interface object oriented processor 306, and to a CRT 314 by a video interface object oriented processor 308. Similarly, an object oriented processor 316 may be provided for formatting input from a variety of sources including, for example, a keyboard 322 and a microphone 324. The input formatter object oriented processor 316 would receive pre-processed input from the keyboard handler object oriented processor 318 and the voice recognition object oriented processor 320. It will therefore be appreciated that in the hierarchical arrangement of object oriented processors shown in FIG. 8, the functionality of one processor is shared by several other processors; i.e., the functionality of the display formatter object oriented processor 302 is shared by the interface object oriented processors 304, 306, and 308; and the functionality of the input formatter object oriented processor 316 is shared by the keyboard handler object oriented processor 318 and the voice recognition object oriented processor 320. According to this embodiment of the invention, the accuracy of data can be enhanced and the speed of communication between object oriented processors can be increased.

As described herein, the object oriented processors communicate with the host processor and with each other via the "comms link" or "comms bus". Those skilled in the art will appreciate that the command language disclosed herein may be used with any type of communications link or bus, be it serial or parallel. Appendix F illustrates how the command language of the invention can be mapped onto the protocols of different bus systems.

There have been described and illustrated herein several embodiments of distributed processing systems, methods of debugging host software in such systems, and methods of inter-processor communication in such systems. While particular embodiments of the invention have been described, it is not intended that the invention be limited thereto, as it is intended that the invention be as broad in scope as the art will allow and that the specification be read likewise. Thus, while particular source code and object code have been disclosed, it will be appreciated that other source code and object code could be utilized. Also, while object oriented processors with certain functionality have been shown, it will be recognized that the invention contemplates object oriented processors having other types of functionality as well. Moreover, while particular configurations have been disclosed in reference to the functionality of the disclosed object oriented processors, it will be appreciated that other configurations could be used as well. Furthermore, while the communication language of the invention has been disclosed as having a specific advantageous syntax, it will be understood that a different syntax can achieve the same or similar function as disclosed herein. In addition, while the object oriented processors according to the invention have been described as preferably implemented as virtual machines, it will be understood that the object oriented processors could be implemented as circuits having the functionality described herein. Further, while the message based communications link has been described as a serial communications bus, it will be understood that any communications bus could be used and several bus systems are described in Appendix F. It will therefore be appreciated by those skilled in the art that yet other modifications could be made to the provided invention without deviating from its spirit and scope as so claimed.

I claim:

1. A method for distributing processing tasks between a host processor and a first object oriented processor having a first task-specific functionality, said method comprising:
   a) providing a high level command language, said high level command language including a first subset of commands for use by the host processor to call on the first task-specific functionality of the first object oriented processor;
   b) programming the host processor to call on the first object oriented processor using messages composed from said first subset of commands to access the first task-specific functionality of the first object oriented processor; and
   c) programming the first object oriented processor to return results of the first task-specific functionality to the host processor using messages composed from said high level command language.

2. A method according to claim 1, for distributing tasks among the host processor, the first object oriented processor, and a second object oriented processor having a second task-specific functionality, further comprising:
   d) providing said high level command language with a second subset of commands for use by the host processor to call on the second task-specific functionality of the second object oriented processor;
   e) programming the host processor to call on the second object oriented processor using messages composed from said second subset of commands to access the second task-specific functionality of the second object oriented processor; and
   f) programming the second object oriented processor to return results of the second task-specific functionality to the host processor using messages composed from said high level command language.

3. A method according to claim 1, wherein:
   at least one of said messages from the host to the first object oriented processor includes at least one command from said first subset of commands and at least one parameter.

4. A method according to claim 1, wherein:
   at least one of said messages from the host to the first object oriented processor is followed by a checksum number.

5. A method according to claim 4, wherein:
   said checksum number is a modulo256 sum of the characters in said at least one of said messages.

6. A method according to claim 3, wherein:
   said at least one command is delimited from said at least one parameter with at least one delimiter character.

7. A method according to claim 6, wherein:

said at least one delimiter character includes a {prior to said at least one command and a } subsequent to said at least one command.

8. A method according to claim 1, wherein:

at least one of said messages from the object oriented processor to the host is selected from the group consisting of data, an error message, and an acknowledgement.

9. A method according to claim 8, wherein:

said data is delimited by a first pair of characters and said error message is delimited by a second pair of characters.

10. A method according to claim 9, wherein:

said first pair of characters is and said second pair of characters is ().

11. A method according to claim 8, wherein:

said acknowledgment is a single character.

12. A method according to claim 11, wherein:

said single character is ^.

13. A method of distributing processing tasks in a distributed processing system having a host processor, a first object oriented processor having a first task-specific functionality, and a second object oriented processor having a second task-specific functionality, a linking table, and a periodic message generator, said method comprising:

a) providing a high level command language including a first subset of commands to call on the first task-specific functionality, a second subset of commands to call on the second task-specific functionality, and a third subset of commands to call on the periodic message generator and the linking table;

b) programming the host processor to call on the second object oriented processor using messages composed from the second subset of commands to access the second task-specific functionality of the second object oriented processor;

c) programming the host processor to call on the linking table and the periodic message generator using the third subset of commands and the first subset of commands to direct the second object oriented processor to transmit a message to the first object oriented processor to call on the first task-specific functionality.

* * * * *